(12) United States Patent
Herrero

(10) Patent No.: US 10,608,985 B2
(45) Date of Patent: Mar. 31, 2020

(54) MULTIHOMING FOR TUNNELED ENCAPSULATED MEDIA

(71) Applicant: Oracle International Corporation, Redwood Shores, CA (US)

(72) Inventor: Rolando Herrero, Derry, NH (US)

(73) Assignee: Oracle International Corporation, Redwood Shores, CA (US)

( * ) Notice: Subject to any disclaimer, the term of this patent is extended or adjusted under 35 U.S.C. 154(b) by 393 days.

(21) Appl. No.: 14/826,774

(22) Filed: Aug. 14, 2015

(65) Prior Publication Data

US 2017/0048192 A1 Feb. 16, 2017

(51) Int. Cl.
*H04J 3/24* (2006.01)
*H04W 12/06* (2009.01)
(Continued)

(52) U.S. Cl.
CPC ...... *H04L 61/2038* (2013.01); *H04L 12/4633* (2013.01); *H04L 61/2007* (2013.01);
(Continued)

(58) Field of Classification Search
CPC ... H04L 67/10; H04L 45/745; H04L 61/2592; H04L 63/166; H04L 45/00; H04L 47/70; H04L 47/822; H04L 61/1511; H04L 61/2015; H04L 65/4076; H04L 45/16; H04L 45/24; H04L 63/10; H04L 63/126; H04L 69/22; H04L 41/0803; H04L 69/164; H04L 61/2575; H04L 29/12528; H04L 12/4641; H04L 47/2416; H04L 65/608; H04L 47/825; H04L 65/601; H04L 61/6077; H04L 65/40; H04L 67/14; H04L 29/06027; H04L 69/16; H04L 65/103; H04L 69/162; H04L 29/06; H04L 61/6063; H04L 69/165; H04L 29/12207; H04L 61/20; H04L 61/2517; H04L 69/163;
(Continued)

(56) References Cited

U.S. PATENT DOCUMENTS 6,907,460 B2 6/2005 Loguinov et al.
7,085,273 B1 8/2006 Chuah
(Continued)

FOREIGN PATENT DOCUMENTS

WO 2003069838 A1 8/2003

OTHER PUBLICATIONS

Kris Hopkins, Why a new network element could make OTT comms better for all, Apr. 4, 2013, pp. -5.*
(Continued)

*Primary Examiner* — Backhean Tiv
*Assistant Examiner* — Linh T. Nguyen
(74) *Attorney, Agent, or Firm* — Potomac Law Group, PLLC

(57) ABSTRACT

A system that implements multihoming for real-time communications receives a request to establish a tunnel by a tunneling server with a tunneling client of user equipment, where the request includes two or more network addresses for the tunnel. The system establishes the tunnel and sends a list of the allocated two or more network addresses for the tunnel. The system then receives encapsulated media that corresponds to at least two different network addresses over the tunnel.

20 Claims, 5 Drawing Sheets

(51) Int. Cl.
*H04L 29/12* (2006.01)
*H04L 29/06* (2006.01)
*H04L 12/46* (2006.01)

(52) U.S. Cl.
CPC ........ *H04L 63/0428* (2013.01); *H04L 63/166* (2013.01); *H04L 61/2061* (2013.01); *H04L 61/6063* (2013.01); *H04L 61/6077* (2013.01)

(58) Field of Classification Search
CPC ............... H04L 69/161; H04L 2212/00; H04L 12/4633; H04L 65/1069; H04L 61/2007; H04L 67/02; H04L 65/1006; H04L 43/0811; H04L 29/125; H04L 63/0272; H04W 76/022; H04W 76/12; H04W 80/04; H04W 40/00; H04M 1/2535
USPC ....... 709/203, 227, 230, 217, 219, 238, 245, 709/220; 370/392, 329, 389, 252, 331, 370/349
See application file for complete search history.

(56) References Cited

U.S. PATENT DOCUMENTS

| | | | | |
|---|---|---|---|---|
| 7,171,492 | B1* | 1/2007 | Borella | H04L 69/16 709/245 |
| 7,376,743 | B1* | 5/2008 | Bazzinotti | H04L 12/4641 370/236 |
| 7,441,043 | B1* | 10/2008 | Henry | H04L 29/1233 709/238 |
| 7,649,848 | B1* | 1/2010 | Swan | H04L 12/2861 370/252 |
| 8,341,480 | B2 | 12/2012 | Kashima et al. | |
| 8,483,133 | B2 | 7/2013 | Navratil et al. | |
| 8,837,289 | B2 | 9/2014 | Darmawan et al. | |
| 9,281,955 | B2* | 3/2016 | Moreno | H04L 45/64 |
| 9,723,069 | B1* | 8/2017 | Fallows | H04L 67/1002 |
| 2001/0034759 | A1* | 10/2001 | Chiles | H04L 12/4633 709/203 |
| 2004/0218603 | A1* | 11/2004 | Lee | H04L 12/1836 370/390 |
| 2005/0160345 | A1 | 7/2005 | Walsh et al. | |
| 2006/0047831 | A1* | 3/2006 | Piper | G06F 9/5083 709/229 |
| 2006/0068907 | A1* | 3/2006 | DiMichele | G07F 17/32 463/30 |
| 2006/0203791 | A1* | 9/2006 | Carrion-Rodrigo | H04L 63/0892 370/338 |
| 2008/0205326 | A1* | 8/2008 | Caradec | H04W 40/02 370/328 |
| 2008/0310366 | A1* | 12/2008 | Oba | H04L 63/0823 370/331 |
| 2009/0034546 | A1* | 2/2009 | Nagata | H04L 12/4641 370/401 |
| 2010/0202323 | A1* | 8/2010 | Nishida | H04W 36/0016 370/254 |
| 2012/0113893 | A1* | 5/2012 | Damola | H04L 12/4633 370/328 |
| 2012/0170445 | A1 | 7/2012 | Perumanam et al. | |
| 2013/0283037 | A1* | 10/2013 | Katz et al. | H04L 29/06 713/280 |
| 2013/0304796 | A1* | 11/2013 | Jackowski | H04L 65/80 709/202 |
| 2014/0006481 | A1* | 1/2014 | Frey | H04L 41/0246 709/203 |
| 2014/0093080 | A1* | 4/2014 | Rajadurai | H04W 12/04 380/270 |
| 2014/0108665 | A1* | 4/2014 | Arora | H04L 67/141 709/227 |
| 2014/0115047 | A1* | 4/2014 | Zhou | H04L 69/30 709/203 |
| 2014/0156855 | A1* | 6/2014 | F | H04L 65/1069 709/227 |
| 2014/0229604 | A1* | 8/2014 | Pfeffer | H04L 47/822 709/224 |
| 2014/0310512 | A1* | 10/2014 | Sau | H04W 76/10 713/151 |
| 2015/0043350 | A1* | 2/2015 | Basilier | H04L 63/0272 370/235 |
| 2015/0100625 | A1* | 4/2015 | Dilouya | H04L 12/2869 709/203 |
| 2017/0195041 | A1* | 7/2017 | Chatterjee | H04B 7/18593 |
| 2019/0068404 | A1* | 2/2019 | Haney | H04L 12/4633 |

OTHER PUBLICATIONS

Oracle Communications Tunneled Session Controller, Essential Guide, Releases S-CX6.4.6F5, Sep. 2014, pp. 1-75 (Year: 2014).*
Suherman Suherman et al., "An efficient negative acknowledgement-based transport protocol in 802.11 media streaming", International Journal of Ad Hoc and Ubiquitous Computing, vol. 16 Issue 3, Aug. 2014, last downloaded Apr. 7, 2015.
Suherman Suherman et al., "A Transport Layer Protocol for Uplink WiMAX Video Streaming", International Journal of Multimedia and Ubiquitous Engineering, vol. 10, No. 1 (2015), pp. 19-32, http://www.sersc.org/journals/IJMUE/vol10_no1_2015/3.pdf.
Yogesh Iyer et al., "STCP: A Generic Transport Layer Protocol for Wireless Sensor Networks", last downloaded Jul. 28, 2015, http://www.utd.edu/~venky/pubs/STCP-ic3n.pdf.
Dzmitry Kliazovich et al., "A Delayed-ACK Scheme for MAC-Level Performance Enhancement of Wireless LANs", last downloaded Jul. 28, 2015, http://disi.unitn.it/~klezovic/papers/DAWL_ict'04.pdf.
Gaetano Guida et al., "LTE and 4G: a comparison with WiMAX", Network Infrastructures A.A. 2010-2011, last downloaded Jul. 28, 2015, http://net.infocom.uniroma1.it/corsi/Network%20Infrastructures/materiale/LTE%20vs%20WiMAX.pdf.
Jim Gemmell et al., "In Search of an API for Scalable Reliable Multicast", Microsoft Research Advanced Technology Division Microsoft Corporation, Technical Report MSR-TR-97-17, Jun. 23, 1997, last downloaded Jul. 28, 2015, http://citeseerx.ist.psu.edu/viewdoc/download?doi=10.1.1.66.680&rep=rep1&type=pdf.
H. Schulzrinne et al.; "RTP: A Transport Protocol for Real-Time Applications";Jul. 2003; 89 pages.
3rd Generation Partnership Project; Technical Specification Group Services and System Aspects; Study on firewall traversal (Stage 2) (Release 12); 3GPP TR 33.830 V0. 5.0 (Nov. 2013).

* cited by examiner

MULTIHOMING FOR TUNNELED ENCAPSULATED MEDIA

FIELD

One embodiment is directed generally to a communications network, and in particular, to the transmission of encapsulated media within a tunnel over a communications network.

BACKGROUND INFORMATION

Many enterprise environments have replaced their Public Switched Telephone Network ("PSTN") telephony services with telephony services that use the Internet Protocol ("IP"), commonly known as Voice over IP ("VoIP") or IP Telephony. Since IP Telephony uses an IP network as its backbone, it can provide advanced features such as video conferencing, call recording, and call forwarding.

Recently, the growing base of mobile data subscribers, the wide availability of Internet access, and the high availability of bandwidth in both fixed and mobile networks has resulted in the popularity of advanced services accessed via the Internet (known as Over-the-Top ("OTT") services). This has caused competitive service providers to offer OTT services and hence face corresponding challenges as they implement these new services.

SUMMARY

One embodiment is a system that implements multihoming for real-time communications. The system receives a request to establish a tunnel by a tunneling server with a tunneling client of user equipment, where the request includes two or more network addresses for the tunnel. The system establishes the tunnel and sends a list of the allocated two or more network addresses for the tunnel. The system then receives encapsulated media that corresponds to at least two different network addresses over the tunnel.

DETAILED DESCRIPTION

Many applications require "multihoming" support (i.e., the need to connect to more than one computer network) in order to access different server capabilities distributed over multiple local network/IP addresses ranging from web services to real time communications. In a tunneling environment, however, this is a problem because only one local internal address is typically associated to any given tunnel. To overcome this problem, one embodiment is directed to a tunneling architecture in which, when the initiation of a tunnel is requested, multiple IP addresses are requested for the tunnel. After the tunnel is created, additional IP addresses can also be allocated.

Figure 1:
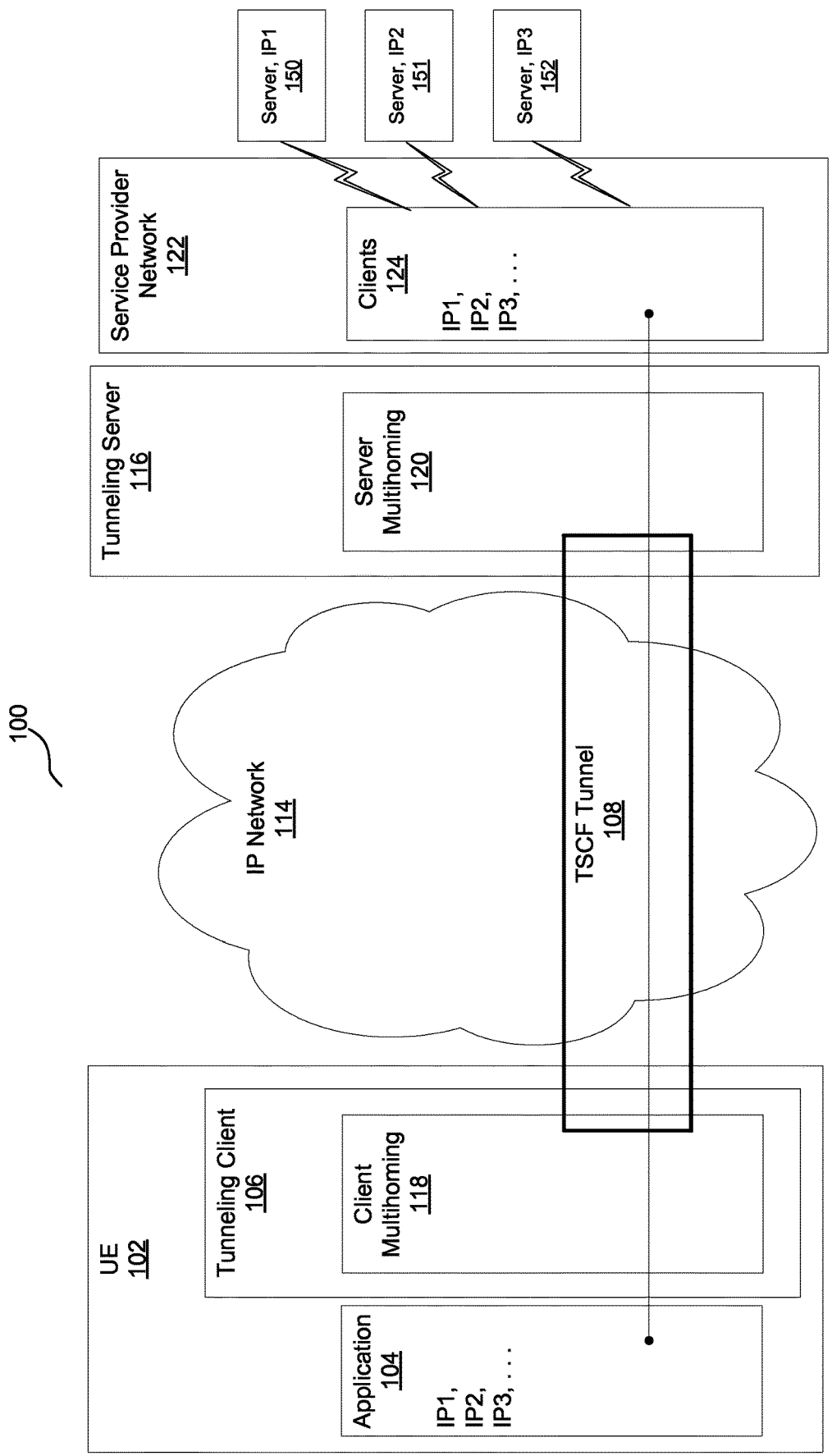
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs real-time communications ("RTC") over an Internet Protocol ("IP") network 114 with a service provider network/backbone 122. In RTC, users exchange information instantly or with insignificant latency. Example applications for RTC include voice and/or video calls, application streaming, softphones, and remote desktop applications. UE 102 may be any device used by an end-user for communications, such as a smartphone, a laptop computer, a tablet, a television, etc.

In performing RTC, UE 102 communicates signaling and media traffic with respective clients 124 in service provider network 122, which may be coupled to multiple servers 150-152 (e.g., web servers), each running on a separate IP address (i.e., IP1, IP2, IP3, etc.). UE 102 includes an application 104 that requires access to each of the servers 150-152 using the corresponding IP addresses (i.e., IP1, IP2, IP3, etc.). Signaling traffic may be communicated according to an application layer protocol such as the Session Initiation Protocol ("SIP"). SIP is configured to be independent of the underlying transport layer. Accordingly, SIP can run on different transport protocols, such as the Transmission Control Protocol ("TCP" as described in, for example, Internet Engineering Task Force ("IETF") request for comments ("RFC") 793 and RFC 675), the User Datagram Protocol ("UDP" as described in, for example, IETF RFC 768), etc.

Network 100 further includes a tunneling server 116 that, together with a tunneling client 106 within UE 102, provides functionality for establishing and managing one or more tunnels for performing RTC according to the Tunneled Services Control Function ("TSCF") standard as described in, for example, 3rd generation partnership program ("3GPP") technical report ("TR") 33.830 V0.5.0, the disclosure of which is hereby incorporated by reference in its entirety. In one embodiment, tunneling client 106 and tunneling server 116 establish a TSCF tunnel 108 that is compliant with TSCF tunnel management (e.g., tunnel initialization, maintenance, termination, etc., as defined by, e.g., 3GPP TR 33.830 V0.5.0), and TSCF tunnel transport protocols are supported for the negotiation of TSCF tunnel 108 between tunneling client 106 and tunneling server 116.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol as provided in, for example, IETF RFC 2246, RFC 4346, RFC 5246, and/or RFC 6176. DTLS is a protocol that provides communications privacy for datagram protocols. TCP and TLS provide reliable, ordered and error-checked delivery of the inner layer traffic, but introduce undesirable latency that is detrimental to RTC applications over a communications network that experiences impairments. On the other hand, UDP and DTLS do not guarantee reliable delivery, thus minimizing latency and being desirable for RTC.

In some embodiments, IP network 114 may include security devices (e.g., firewalls, proxies, etc.) that allow traffic of only a certain transport protocol (e.g., only TCP, only UDP, etc.). Accordingly, tunneling client 106 and tunneling server 116 may establish and manage TSCF tunnel 108 such that UE 102 may use it to traverse such security devices and connect to tunneling server 116 to reach servers 124 in service provider network 122.

The TSCF standard further provides control messages for exchanging configuration information between tunneling client 106 and tunneling server 116. According to the TSCF standard, control messages are of a "request/response" type, and a control message response for a request includes either a corresponding reply or an error code indicating why the request cannot be honored by the receiving end. TSCF control messages use a Type Length Value ("TLV") encoding. TLV is a variable length concatenation of a unique type and a corresponding value.

Each TSCF control message includes a control message ("CM") header at the beginning, including a "CM_Version" field identifying the version of the header and indicating the outer transport protocol of a TSCF tunnel, a "CM_Indication" field identifying whether the message is a control message or not, a "Reserved" field reserved for future use, a "CM_Type" field identifying the type of the control message (e.g., whether it is a request or a response, the corresponding functionality, etc.), a "TLV_Count" field indicating the number of TLVs that follow or are appended to the header in the corresponding control message, a "Tunnel Session ID" ("TSID") field including a tunnel session identifier ("ID") assigned by tunneling server 116 to uniquely identify TSCF tunnel 108, and a "Sequence" field that is incremented per message, as described in, for example, 3GPP TR 33.830 V0.5.0.

In one embodiment, in order to establish TSCF tunnel 108, tunneling client 106 sends a "configuration request" message to tunneling server 116 to obtain configuration information for TSCF tunnel 108. In a "configuration request" message, the TSID header field bits are set to 1 (i.e., FFFF . . . ). In response, tunneling server 116 assigns a TSID to a TSCF tunnel and sends a "configuration response" message back to tunneling client 106. The "configuration response" message includes the TSID assigned by tunneling server 116 to TSCF tunnel 108. The subsequent messages between tunneling client 106 and tunneling server 116 include this assigned TSID in their headers.

In one embodiment, if a control message is communicated between tunneling client 106 and tunneling server 116 and does not include the expected TSID, the control message is dropped and the corresponding TSCF tunnel is terminated. Alternatively, in one embodiment, tunneling client 106 may send a "configuration release request" message to tunneling server 116 to terminate a TSCF tunnel. In response to such a "configuration release request" message, tunneling server 116 sends a "configuration release response" message to tunneling client 106. At this time, TSCF tunnel 108 is terminated.

In one embodiment, UE 102 executes application 104 that may be a SIP based RTC application relying on a library such as the software development kit ("SDK") provided by the Tunneled Session Management ("TSM") solution from Oracle Corp. The TSM solution employs a client/server architecture using session border controllers ("SBCs") and client applications, such as application 104, that may be developed using the SDK. The client applications initiate secure communications sessions with the service provider over the internet. As previously discussed, in some environments, application 104 requires access to multiple IP addresses at multiple servers, for example IP1, IP2, IP3, etc. The session border controllers (e.g., implemented by tunneling server 116) at the edge of the network terminate and control the tunnels before passing the secure traffic into the service core of service provider network 122. In one embodiment, SDKs are implemented by client multihoming module 118 and/or server multihoming module 120. In general, for the functionality of tunnel 108, client multihoming module 118 requests multiple IP addresses, and server multihoming module 120 allocates the requested multiple IP addresses.

Figure 2:
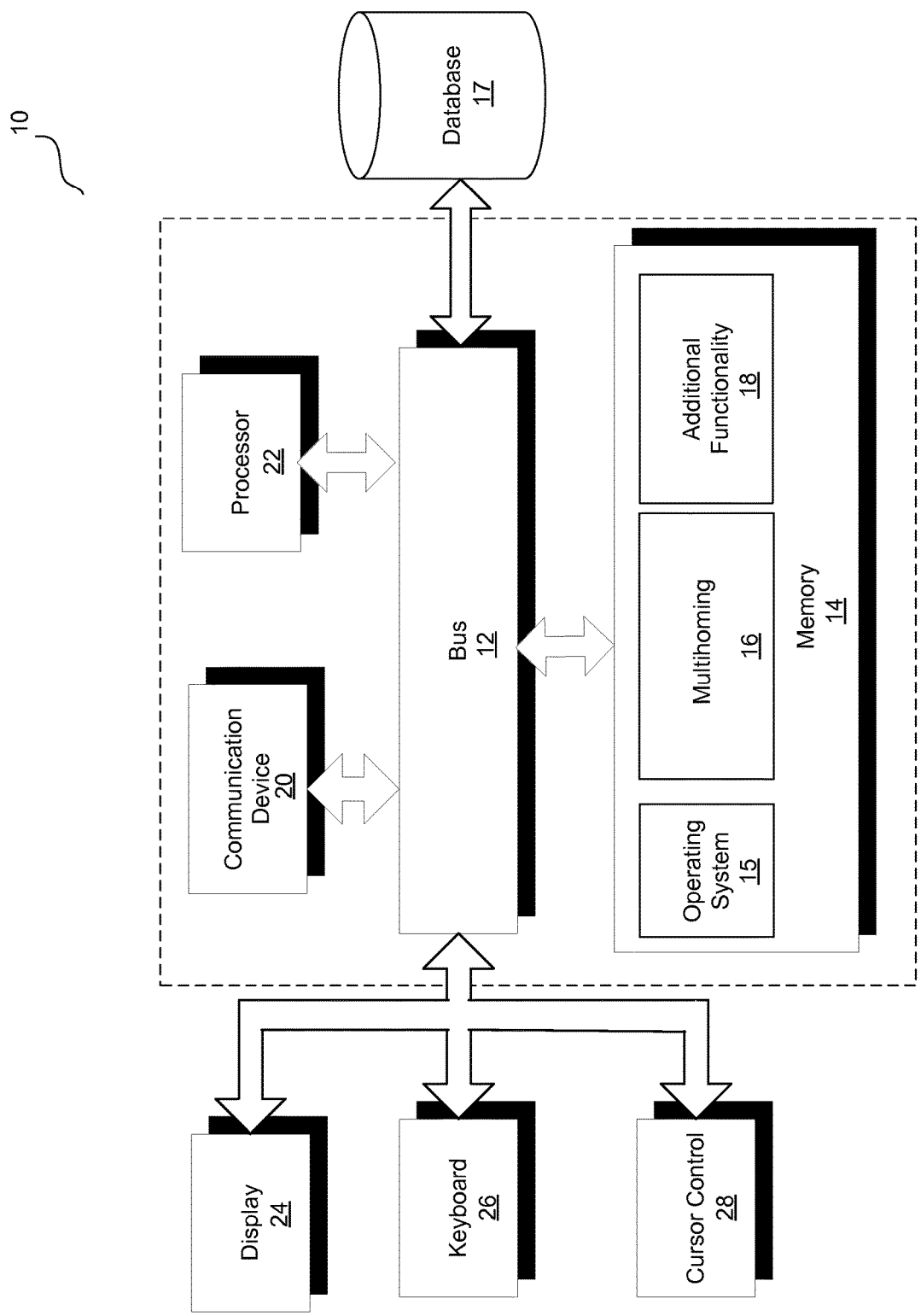
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of tunneling server 116 of FIG. 1, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a multihoming module 16 for providing multihoming functionality in a tunneled environment, and all other functionality disclosed herein. In one example embodiment, multihoming module 16 may implement tunneling server 116 of FIG. 1 in conjunction with one or more remaining elements of FIG. 2. System 10 can be part of a larger system, such as added functionality to the "Acme Packet 4500" session border controller from Oracle Corp. Therefore, system 10 can include one or more additional functional modules 18 to include the additional functionality. A database 17 is coupled to bus 12 to provide centralized storage for multihoming module 16 and additional functional modules 18.

In one embodiment, multihoming module 16 and/or additional functional modules 18 may include several modules to provide the multihoming functionality. The modules in one embodiment include a tunneling module that establishes a tunnel with a tunneling client of a user equipment and a multihoming allocation module that allocates multiple IP address for the tunnel in response to a multihoming request.

As disclosed, embodiments generate a tunnel and allow multiple IP addresses to be requested for the tunnel to implement mulithoming. In one embodiment, client 108 requests more than a single local internal IP address when sending a configuration request. Server 116 assigns and maps multiple local IP addresses to a single tunnel. In one embodiment, server 116 issues a configuration response as an answer to the request, including the list of assigned addresses.

In one embodiment, client 108, via service requests, dynamically requests additional local internal IP addresses once a tunnel is already set up. Server 116 dynamically assigns and maps additional local internal IP addresses once a tunnel is already set up. Further, server 116 issues a service response as an answer to the request, including the assigned IP addresses. In one embodiment, mulithoming module 16 and/or additional functional modules 18 may include several modules to provide the mulithoming functionality.

Referring again to FIG. 1, with known systems, TSCF tunnel 108 may encapsulate different types of traffic ranging from pure data to real-time media. In general, data and real-time media are subject to different Quality of Service ("QoS") requirements. For example, data may be sensitive to integrity while real-time media may be sensitive to latency. In a tunneling configuration, encapsulated (i.e., in a packet/frame) media is typically communicated according to the real-time transport protocol ("RTP" as provided, for example, in IETF RFC 3550).

Figure 3:
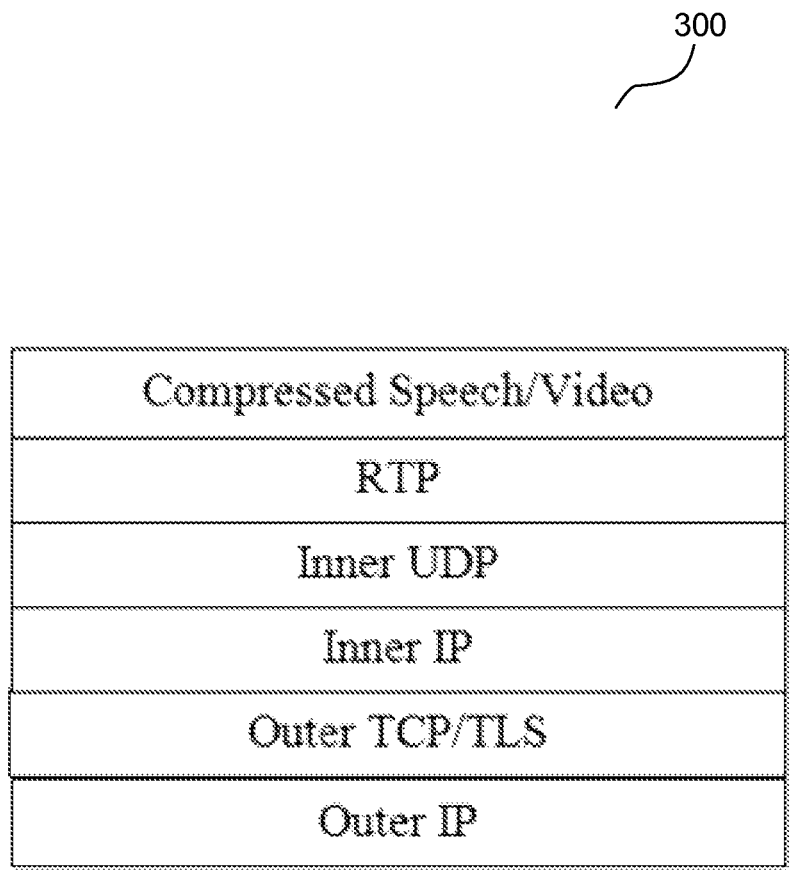
FIG. 3 illustrates example protocol layers in a TSCF tunneling configuration for encapsulating media traffic according to an embodiment.

In a TSCF tunneling configuration, RTC (e.g., speech, video, etc.) may be subject to two levels of transport: one at the outer tunnel layer typically according to TCP/TLS, and another at the inner tunnel layer typically according to UDP. FIG. 3 illustrates example protocol layers in a TSCF tunneling configuration 300 for encapsulating media traffic according to an embodiment. In TSCF tunneling configuration 300, compressed media (e.g., speech, video, etc.) is communicated according to RTP at the application layer, and is transported via an inner UDP at the inner transport layer within an inner IP at the inner network layer. The inner layers are within an outer TCP/TLS at the outer transport layer which is in turn within an outer IP at the outer network layer. In one embodiment, since most IP networks block any outer traffic that is not stream-based, TCP/TLS is used at the outer transport layer of TSCF tunnel 108 to guarantee delivery.

As previously disclosed, in known tunneling environments, multihoming is not supported because only one local internal address is typically associated to any given tunnel. One known solution is to create multiple tunnels and support only one server application per tunnel. However, the additional tunnels create a large amount of extra overhead both at the client and server levels. In contrast, embodiments are directed to a tunneling architecture in which, when the initiation of a tunnel is requested, multiple IP addresses are requested for the tunnel. After the tunnel is created, additional IP addresses can also be allocated for that single tunnel.

One embodiment provides TSCF SDKs that support an application programming interface ("API") so that application 104 can enable multihoming for a specific inner socket. For example, application 104 may enable multihoming at tunneling client 106 for an inner socket by executing a corresponding "tsc_setsockopt" API (i.e., a set socket API) with a corresponding new socket option when an inner socket is created. The TSCF SDK provides a Berkeley software distribution ("BSD")-like socket API that can be used to send and receive encapsulated media using the tsc_sendto and tsc_recvfrom functions, respectively.

Figure 4:
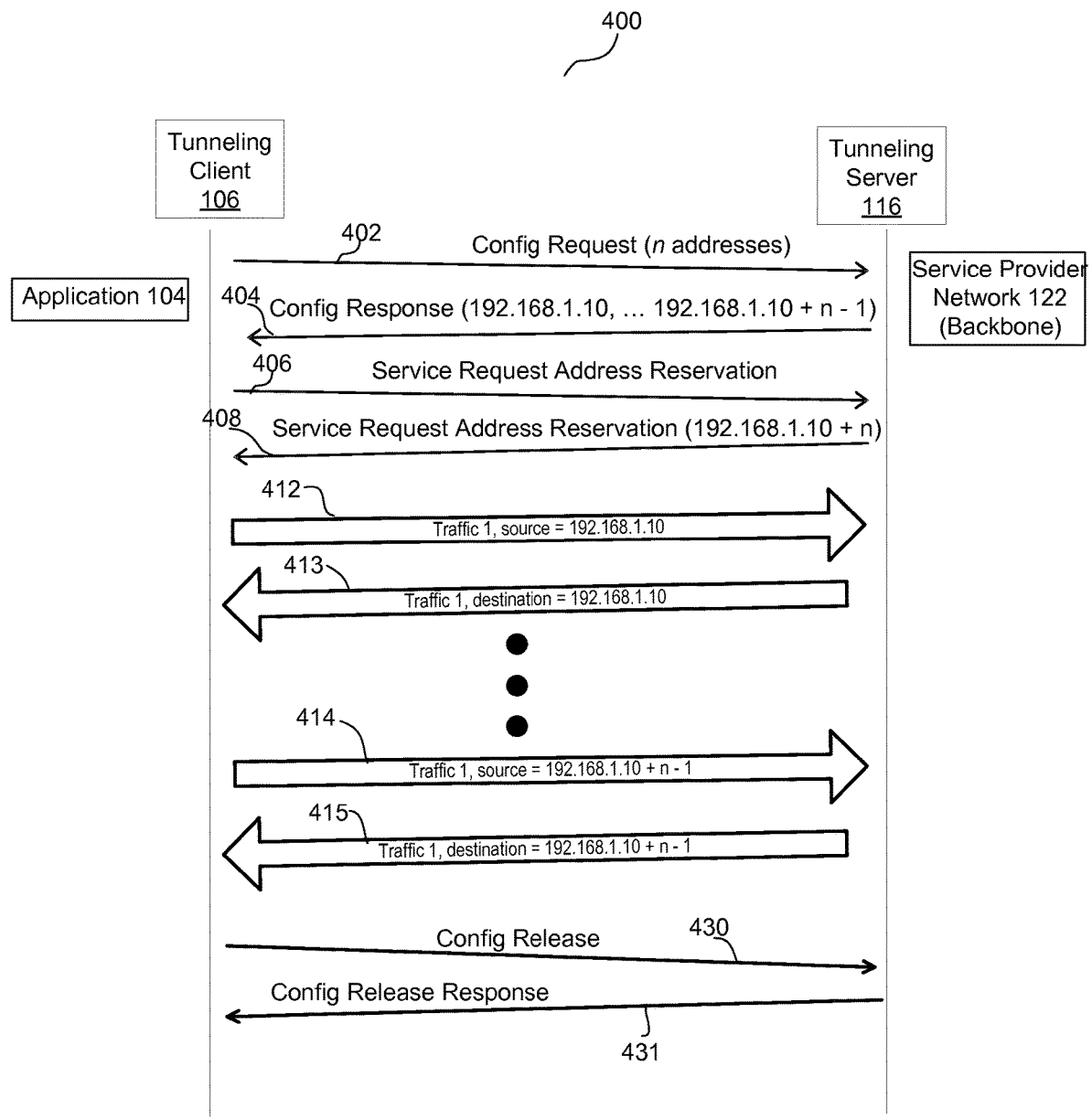
FIG. 4 is an example message sequence diagram, including the sequence of messages exchanged between a tunneling client and a tunneling server, for performing multihoming for tunneled encapsulated traffic according to some embodiments.

FIG. 4 is an example message sequence diagram 400, including the sequence of messages exchanged between tunneling client 106 and tunneling server 116, for performing multihoming for tunneled encapsulated traffic according to some embodiments. FIG. 4 includes network elements such as tunneling client 106 in communication with application 104, and tunneling server 116 in communication with service provider network 122, as described herein with reference to FIG. 1.

At 402, tunneling client 106 sends a configuration request message to tunneling server 116 to establish TSCF tunnel 108. The configuration request message requests n local inner socket network addresses across multiple sockets but within a single tunnel 108. At 404, tunneling server 116 responds to the configuration request message of tunneling client 106 with a configuration response message that includes a list of the allocated internal addresses, ranging in the example of FIG. 4 from 192.168.1.10 to 192.168.1.10+ n−1.

Configuration request and response messages allow for tunneling client 106 to obtain configuration information for TSCF tunnel 108 from tunneling server 116, as described in, for example, 3GPP TR 33.830 V0.5.0. In one embodiment, from the application perspective, application 104 at UE 102 creates TSCF tunnel 108 by executing a "tsc_ctrl_new_tunnel" API, and the configuration response message is sent to tunneling server 116 in response to the execution of this API.

Upon completing the exchange of request/response messages, tunneling client 106 and tunneling server 116 may use TSCF tunnel 108 for performing RTC and communicating signaling traffic and media traffic. In one embodiment, when inner signaling and media sockets are needed to place a call (e.g., for communicating SIP call control traffic or RTP media traffic), application 104 creates these sockets on TSCF tunnel 108 by executing a "tsc_socket" API. A socket is created by determining a socket type (e.g., datagram vs. stream) and a tunnel on which the socket should be created. In one embodiment, when a socket is created, application 104 binds the socket by executing a "tsc_bind" API. The bind function assigns a specific transport port (e.g., TCP or UDP) to the socket. This port is later used as a source port of all traffic generated by the socket. In one embodiment, if an inner socket is created in TSCF tunnel 108, there is a binding at tunneling server 116 that links the internal IP address of TSCF tunnel 108 to that socket.

Once tunnel 108 has been created, if application 104 needs even more internal IP addresses, it can issue a service request that requests the reservation of additional IP addresses. For example, specific servers, such as servers 150-152, that need to be accessed by UE 102 may require different, unique IP addresses than the initially assigned IP address. For example, an IP and TCP port may be used to answer SIP calls and a different IP address but same port may be used for a web service. Therefore, at 406, a service request address reservation is issued.

In response, if server 116 complies with the request, it sends back an address reservation service response 408 that includes the information of the address that was reserved (e.g., 192.168.1.10+n). Therefore, additional network addresses are dynamically created. Server 116 may determine, for example, the available resources (e.g. memory and IP addresses in the address pool) when deciding whether to comply with the request.

Subsequently, encapsulated media traffic is sent over any or all available IP addresses, between client 106 and 116 through tunnel 108, as shown for example at 412-415.

When application 104 tears down tunnel 108, it issues a tsc_delete_tunnel that internally triggers a configuration release request at 430 that is answered by server 116 with a configuration release response at 431. This action releases all IP addresses that are associated with tunnel 108 in server 116.

One embodiment supports multihoming by providing "Service_Type" TLV values to indicate address reservation, and an "Address_Range" TLV value to indicate the number of addresses to be requested. If the Address_Range TLV is not present, it is assumed that only one address is being requested. Table 1 below provides example TSCF TLVs for providing multihoming functionality according to some embodiments.

where the API prototype is given by:

```
tsc_handle tsc_new_tunnel (tsc_tunnel_params * tunnel_params,
tsc_requested_config * requested_config);
```

To request an additional local address, on-the-fly once tunnel 108 has been already established, in one embodiment an API function called "tsc_request_address" is added to the SDK structure, as shown in the following example pseudo-code:

```
tsc_bool tsc_request_address(tsc_handle handle)
``` where "handle" points to the tunnel that is requesting the additional address and the function returns a boolean type to indicate success (i.e., true) or failure (i.e., false). Since this function is non-blocking, a notification API "tsc_notification_address" is added to notify client 106 once the address becomes available. The following example pseudo-code shows how the notification is enabled and the notification callback function in accordance with one embodiment:

```
tsc_notification_enable(tsc_handle, tsc_notification_address,
address_notification, NULL);
void address_notification(tsc_notification_data *notification)
{
    tsc_notification_address_info_data *address_data =
    (tsc_notification_address_info_data
*)notification->data;
```

TABLE 1

| TLV TYPE | | | SHORT/ LONG | VALUE | | |
|---|---|---|---|---|---|---|
| NAME | VALUE | SEMANTICS | FORMAT | TYPE | LENGTH | NOTES |
| Address_Range | 37 | Number of Addresses to Request | Short | Unsigned integer | 2 bytes | |
| Service_Type | 27 | Service Type | Short | Unsigned integer | 1 byte | Address_Reservation = 30 |

In order to request multiple local IP addresses, in one embodiment a field "additional_addresses" in the "tsc_tunnel_params" of the SDK structure is added. This field indicates how many addresses, beyond the default one, are to be requested when the tunnel is created by means of a "tsc_ctrl_new_tunnel API", as shown in the following example pseudo-code in accordance with one embodiment:

```
typedef struct
{
    tsc_connection_params
    connection_params[TSC_MAX_CONNECTION_PARAMS];
    tsc_security_config
    sec_config[TSC_MAX_SECURITY_CONFIGS];
    uint32_t max_connections;
    tsc_bool connection_timeout_max_set;
    time_t connection_timeout_max;
    tsc_keepalive_refresher keepalive_refresher;
    uint32_t tsc_fast_keepalive_interval;
    tsc_pcap_capture pcap_capture;
    char clientId[TSC_MAX_CLIENT_ID_LENGTH];
    int8_t additional_addresses;
} tsc_tunnel_params;
```

-continued

```
    printf("the additional requested address is %X\n",
    address_data->address.address);
}
``` and the "tsc_notification_address_info_data" structure is:

```
typedef struct
{
    tsc_ip_address addres;
} tsc_notification_address_info_data;
```

The fourth NULL parameter in "tsc_notification_enable" is an opaque/private data pointer that can be recovered in the "tsc_notification_data" structure upon callback.

One embodiment that is implemented using an SBC, such as the Acme Packet 4500 from Oracle Corp., provides a configuration object "tscf-interface." A configuration field, "max-address-count", is added to the tscf-interface configuration element to account for the maximum number of extra local addresses that are to be requested per individual tunnel. The possible range of values in one embodiment is between 1 and 256, where 1 is the default value.

The following functionality provides an example interface configuration for providing multihoming according to one embodiment:

```
tscf-interface
    realm-id            access
    state               enabled
    max-tunnels         100
    max-address-count   10
local-address-pools     pool
assigned-services       SIP
tscf-port
    address                         192.168.31.10
    port                80
    transport-protocol  TCP
    tls-profile
    rekey-profile
last-modified-by        admin@console
last-modified-date      2015-02-12 10:00:00
```

The following is an example extensible markup language ("XML") functionality for providing multihoming according to one embodiment:

```
<tscfInterface realmID='access'
        state='enabled'
        maxTunnels='100'
        assignedServices='SIP'
        options=''
        lastModifiedBy='admin@console'
        lastModifiedDate='2015-02-12 10:00:00'
        objectId='33'>
        <key>access</key>
    <maxAddressCount=10/>
        <localAddressPool name='pool'/>
        <tscfPort address='192.168.31.10'
            port='80'
            transProtocol='TCP'
            tlsProfile=''
            rekeyProfile=''
</tscfInterface>
```

Figure 5:
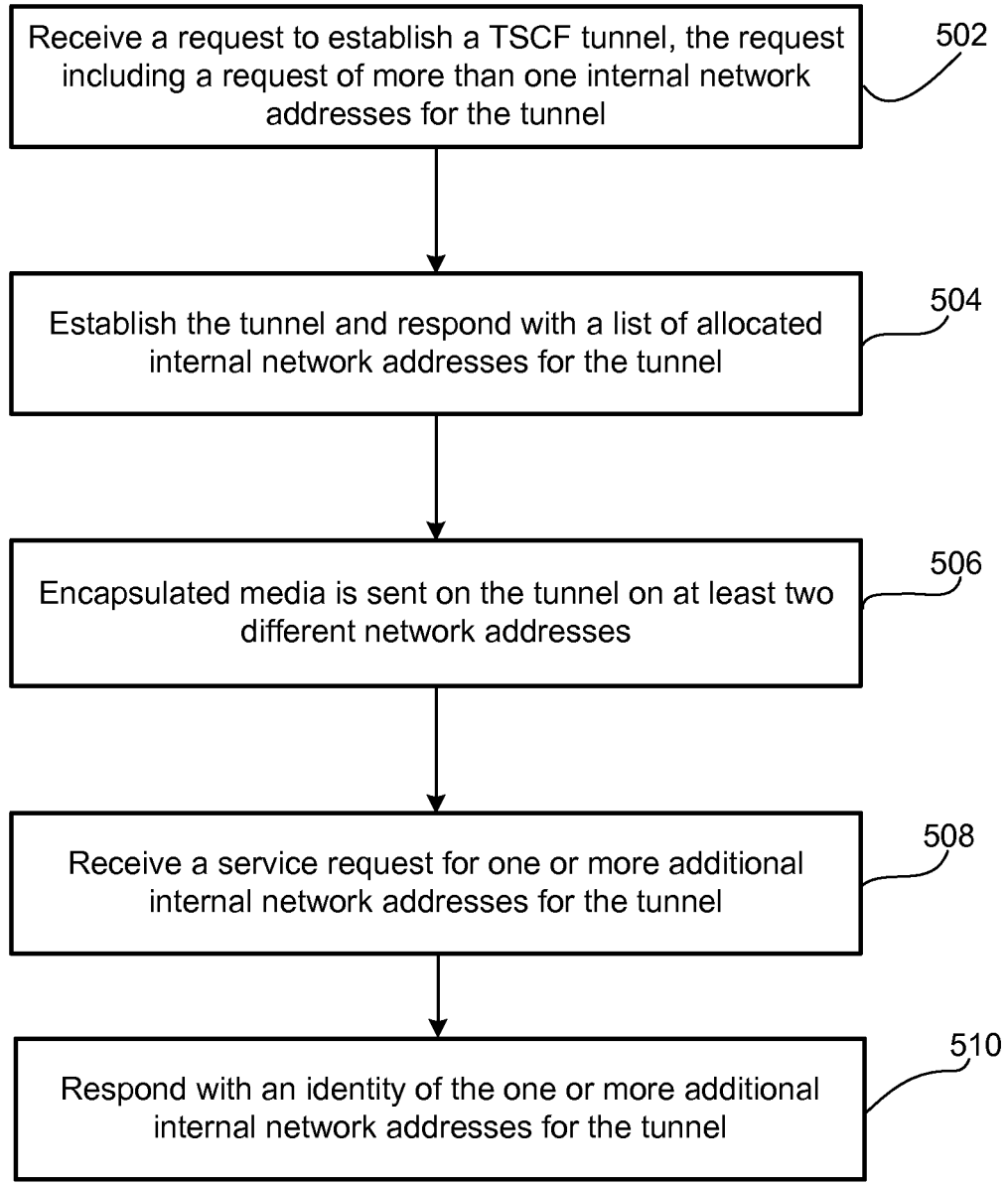
FIG. 5 is a flow diagram of a multihoming module of FIG. 2 and/or a tunneling client and a tunneling server of FIG. 1 when implementing multihoming for tunneled encapsulated traffic in accordance with embodiments of the present invention.

FIG. 5 is a flow diagram of multihoming module 16 of FIG. 2 and/or tunneling client 106 and tunneling server 116 of FIG. 1 when implementing multihoming for tunneled encapsulated traffic in accordance with embodiments of the present invention. In one embodiment, the functionality of the flow diagram of FIG. 5 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 502, a request to establish a TSCF tunnel 108 is received by tunneling client 106 at tunneling server 116. The request includes a request of more than one internal network addresses, which in one embodiment are IP addresses (i.e., IP addresses assigned to tunnel 108).

At 504, tunneling server 116 establishes tunnel 108 and responds to the request with a response that includes a list of allocated internal network addresses for tunnel 108. Tunnel 108 can include multiple inner sockets, such as a separate inner socket for speech data, video data, etc.

At 506, encapsulated media is sent between client 106 and server 116 on tunnel 108 over at least two different network addresses. Server 116, and then clients 124, will then forward the messages to additional servers 150-152 that correspond to each different IP/network addresses by having server 116 decapsulating the received encapsulated media and forwarding the decapsulated media to service provider network 122 and to each corresponding network address.

At 508, at any time after tunnel 108 is established, a service request is received from client 106 request one or more additional internal network addresses.

At 510, in response to the request, server 116 replies with an address reservation service response that includes an identity of the one or more additional internal network addresses that subsequently can be used to transmit encapsulated media. Therefore, additional network addresses are dynamically created.

As disclosed, embodiments allow for multiple network addresses to be requested and allocated for a single tunnel. Encapsulated media traffic can be sent to each and every network address on the same tunnel. Further, additional network addresses can be requested and allocated dynamically after the tunnel is established.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of performing multihoming for real-time communications (RTC), the method comprising:
   receiving, by a tunneling server, a request to establish a tunnel from a tunneling client of a user equipment (UE), wherein the request comprises a first network address for the tunnel and a second network address for the tunnel, and the request is transmitted from a tunneling client side of the tunnel to a tunneling server side of the tunnel, the first network address corresponding to a first server on a tunneling server side of the tunnel and the second network address corresponding to a second server, different from the first server, on the tunneling server side of the tunnel;
   establishing the tunnel and sending a list of allocated network addresses for the tunnel, the network addresses including the first network address and the second network address, each of the network addresses corresponding to a different inner socket and corresponding to different local Internet Protocol (IP) internal addresses assigned to the tunnel; and
   receiving, at the tunneling server after being transmitted via the tunnel, encapsulated media that corresponds to both the first network address from a first inner socket and the second network address from a second inner socket that is different from the first inner socket, wherein the encapsulated media is generated by an application executed by the UE and includes first encapsulated media with the first network address and second encapsulated media with the second network address; and
   decapsulating, at the tunneling server, the received encapsulated media and forwarding the decapsulated media to a service provider network, the decapsulated media corresponding to the first network address being forwarded to the first server and the decapsulated media corresponding to the second network address being forwarded to the second server.

2. The method of claim 1, wherein the tunnel is configured according to a tunneled services control function (TSCF) standard.

3. The method of claim 1, wherein the UE sends the request when an application at the UE executes an application programming interface (API) to request the network addresses.

4. The method of claim 1, wherein the network addresses each correspond to a different web server.

5. The method of claim 1, further comprising:
after establishing the tunnel, receiving a request for one or more additional network addresses for the tunnel; and
in response to the request, providing a response that includes an identity of one or more additional network addresses.

6. The method of claim 1, wherein the received encapsulated media is transmitted across multiple inner sockets of the tunnel.

7. The method of claim 1, wherein the tunneling server comprises a session border controller.

8. A tunneling server comprising:
a processor; and
a storage device coupled to the processor that stores a multihoming module, the multihoming module, when executed by the processor:
receives, by a-the tunneling server, a request to establish a tunnel from a tunneling client of a user equipment (UE), wherein the request comprises a first network address for the tunnel and a second network address for the tunnel, and the request is transmitted from a tunneling client side of the tunnel to a tunneling server side of the tunnel, the first network address corresponding to a first server on a tunneling server side of the tunnel and the second network address corresponding to a second server, different from the first server, on the tunneling server side of the tunnel;
establishes the tunnel and sending a list of allocated network addresses for the tunnel, the network addresses including the first network address and the second network address, each of the network addresses corresponding to a different inner socket and corresponding to different local Internet Protocol (IP) internal addresses assigned to the tunnel; and
receives, at the tunneling server after being transmitted via the tunnel, encapsulated media that corresponds to both the first network address from a first inner socket and the second network address from a second inner socket that is different from the first inner socket, wherein the encapsulated media is generated by an application executed by the UE and includes first encapsulated media with the first network address and second encapsulated media with the second network address; and
decapsulates, at the tunneling server, the received encapsulated media and forwarding the decapsulated media to a service provider network, the decapsulated media corresponding to the first network address being forwarded to the first server and the decapsulated media corresponding to the second network address being forwarded to the second server.

9. The tunneling server of claim 8, wherein the tunnel is configured according to a tunneled services control function (TSCF) standard.

10. The tunneling server of claim 8, wherein the UE sends the request when an application at the UE executes an application programming interface (API) to request the network addresses.

11. The tunneling server of claim 8, wherein the network addresses each correspond to a different web server.

12. The tunneling server of claim 8, the multihoming module, when executed by the processor:
after establishing the tunnel, receives a request for one or more additional network addresses for the tunnel; and
in response to the request, provides a response that includes an identity of one or more additional network addresses.

13. The tunneling server of claim 8, wherein the processor implements a session border controller.

14. A non-transitory computer readable medium having instructions stored thereon that, when executed by a processor, cause the processor to perform multihoming for real-time communications (RTC), the multihoming comprising:
receiving, by a tunneling server, a request to establish a tunnel from a tunneling client of a user equipment (UE), wherein the request comprises a first network address for the tunnel and a second network address for the tunnel, and the request is transmitted from a tunneling client side of the tunnel to a tunneling server side of the tunnel, the first network address corresponding to a first server on a tunneling server side of the tunnel and the second network address corresponding to a second server, different from the first server, on the tunneling server side of the tunnel;
establishing the tunnel and sending a list of allocated network addresses for the tunnel, the network addresses including the first network address and the second network address, each of the network addresses corresponding to a different inner socket and corresponding to different local Internet Protocol (IP) internal addresses assigned to the tunnel; and
receiving, at the tunneling server after being transmitted via the tunnel, encapsulated media that corresponds to both the first network address from a first inner socket and the second network address from a second inner socket that is different from the first inner socket, wherein the encapsulated media is generated by an application executed by the UE and includes first encapsulated media with the first network address and second encapsulated media with the second network address; and
decapsulating, at the tunneling server, the received encapsulated media and forwarding the decapsulated media to a service provider network, the decapsulated media corresponding to the first network address being forwarded to the first server and the decapsulated media corresponding to the second network address being forwarded to the second server.

15. The non-transitory computer readable medium of claim 14, wherein the tunnel is configured according to a tunneled services control function (TSCF) standard.

16. The non-transitory computer readable medium of claim 14, wherein the UE sends the request when an application at the UE executes an application programming interface (API) to request the network addresses.

17. The non-transitory computer readable medium of claim 14, wherein the network addresses each correspond to a different web server.

18. The non-transitory computer readable medium of claim 14, further comprising:
after establishing the tunnel, receiving a request for one or more additional network addresses for the tunnel; and
in response to the request, providing a response that includes an identity of one or more additional network addresses.

19. The non-transitory computer readable medium of claim 14, wherein the received encapsulated media is transmitted across multiple inner sockets of the tunnel.

20. The non-transitory computer readable medium of claim 14, wherein the tunneling server comprises a session border controller.

* * * * *

UNITED STATES PATENT AND TRADEMARK OFFICE
CERTIFICATE OF CORRECTION

PATENT NO.       : 10,608,985 B2                                   Page 1 of 1
APPLICATION NO.  : 14/826774
DATED            : March 31, 2020
INVENTOR(S)      : Herrero It is certified that error appears in the above-identified patent and that said Letters Patent is hereby corrected as shown below:

In the Specification

In Column 5, Line 19, delete "mulithoming." and insert -- multihoming. --, therefor.

In Column 5, Line 32, delete "mulithoming" and insert -- multihoming --, therefor.

In Column 5, Line 34, delete "mulithoming" and insert -- multihoming --, therefor.

In the Claims

In Column 11, Line 24, in Claim 8, delete "a-the" and insert -- the --, therefor.

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*